United States Patent [19]
Hossain

[11] Patent Number: 5,671,415
[45] Date of Patent: Sep. 23, 1997

[54] SYSTEM AND METHOD FOR FACILITATING SOFTWARE DEVELOPMENT

[75] Inventor: K. Omar Hossain, Midland, Mich.

[73] Assignee: The Dow Chemical Company, Midland, Mich.

[21] Appl. No.: 252,392

[22] Filed: Jun. 1, 1994

Related U.S. Application Data

[63] Continuation of Ser. No. 986,182, Dec. 7, 1992, abandoned.
[51] Int. Cl.$^6$ ........................................ G06F 3/00
[52] U.S. Cl. .................... 395/701; 395/712; 364/468.02; 364/468.03
[58] Field of Search ........................ 395/650, 700, 395/712, 701, 702, 703; 364/468, 468.02, 468.03

[56] References Cited

U.S. PATENT DOCUMENTS

| | | | |
|---|---|---|---|
| 4,204,253 | 5/1980 | van den Hanenberg et al. | 364/200 |
| 4,734,854 | 3/1988 | Afshar | 364/200 |
| 4,742,467 | 5/1988 | Messerich et al. | 364/200 |
| 4,809,170 | 2/1989 | Leblang et al. | 364/200 |

(List continued on next page.)

OTHER PUBLICATIONS

"Building and Managing Software Libraries" by Gerald Jones et al, IEEE 1988.
"Tailoring Configuration Management Tools For Development of Avionics Software" by John Uczekaj, IEEE 1990.
"Knowledge Representation For Model Libraries" by Michael V. Mannino et al, IEEE 1988.
"SYMCELL—A Symbolic Standard Cell System" by K. Ramachandran et al, IEEE, 1991.

(List continued on next page.)

*Primary Examiner*—Alvin E. Oberley
*Assistant Examiner*—Michael T. Richey
*Attorney, Agent, or Firm*—Sterne, Kessler, Goldstein & Fox

[57] ABSTRACT

A system and method for automated development of robust, highly reliable, software code conforming to applicable shop and industry standards is provided. The system comprises a design template library, a module template library, and a software development workstation interfaced to the libraries. The design template library stores design templates which provide detailed project processes, process data, and linkages between the processes and the process data. The module template library stores module templates which are pre-defined, pre-prepared software modules for performing specified tasks. The system further comprises an operations file for storing operational applications programs and newly developed application programs for operations testing, and a development library for providing a working area in which to develop application programs. A programmer reviews a design template to determine project specifications, processes, process data, and linkages between the process and the process data. If the project requires modification to an existing program, a copy is retrieved from the operations file. The programmer checks-out the module templates which are integrated into the application program, or used to build new code from scratch by using calls from mainline code. Once the module templates are integrated, the applications program is put through unit and integration testing and checked into the operations file for operational and user testing in an operational environment, and for subsequent operations.

8 Claims, 7 Drawing Sheets

U.S. PATENT DOCUMENTS

| | | | |
|---|---|---|---|
| 4,831,525 | 5/1989 | Saito et al. | 364/300 |
| 4,831,580 | 5/1989 | Yamada | 364/900 |
| 4,860,204 | 8/1989 | Gendron et al. | 395/700 |
| 4,864,569 | 9/1989 | De Lucia et al. | 371/19 |
| 4,868,770 | 9/1989 | Smith et al. | 364/578 |
| 4,949,253 | 8/1990 | Chigira et al. | 364/200 |
| 5,050,088 | 9/1991 | Buckler et al. | 364/468 |
| 5,084,813 | 1/1992 | Ono | 395/1 |
| 5,101,491 | 3/1992 | Katzeff | 395/500 |
| 5,151,984 | 9/1992 | Newman et al. | 395/500 |
| 5,222,030 | 6/1993 | Dangelo et al. | 364/489 |
| 5,260,866 | 11/1993 | Lisinski et al. | 364/401 |
| 5,321,610 | 6/1994 | Breslin | 364/419.19 |
| 5,357,440 | 10/1994 | Talbott et al. | 364/467 |

OTHER PUBLICATIONS

"Design of a Process–Tolerant Cell Library for Regular Structures Using Symbolic Layout and Hierarchical Compaction" by L. Rijnders, IEEE 1988.

"Delay and Area Optimization in Standard Cell Design" by Shen Lin et al, IEEE 1990.

"Software Integration in Design of Flexible Manufacturing Systems" by Godavari et, al, Intelligent Control, 1991 Int'l Symposium, Mar. 1991.

Wirfs–Brock et al, "Surveying Current Research in Object-Oriented Design", Communications of the ACM, Sep. 1990, vol. 33, No. 9, pp. 104–123.

J. F. Peters, III, "Compleat C", 1986, pp. 14–20.

"A Rule–Based Approach To Modular System Design" by Francesco Parisi–Presicce, IEEE 1990.

"Object–Oriented Toolkit For Constructing Specification Editors" by Bourdeau et al, IEEE 1992.

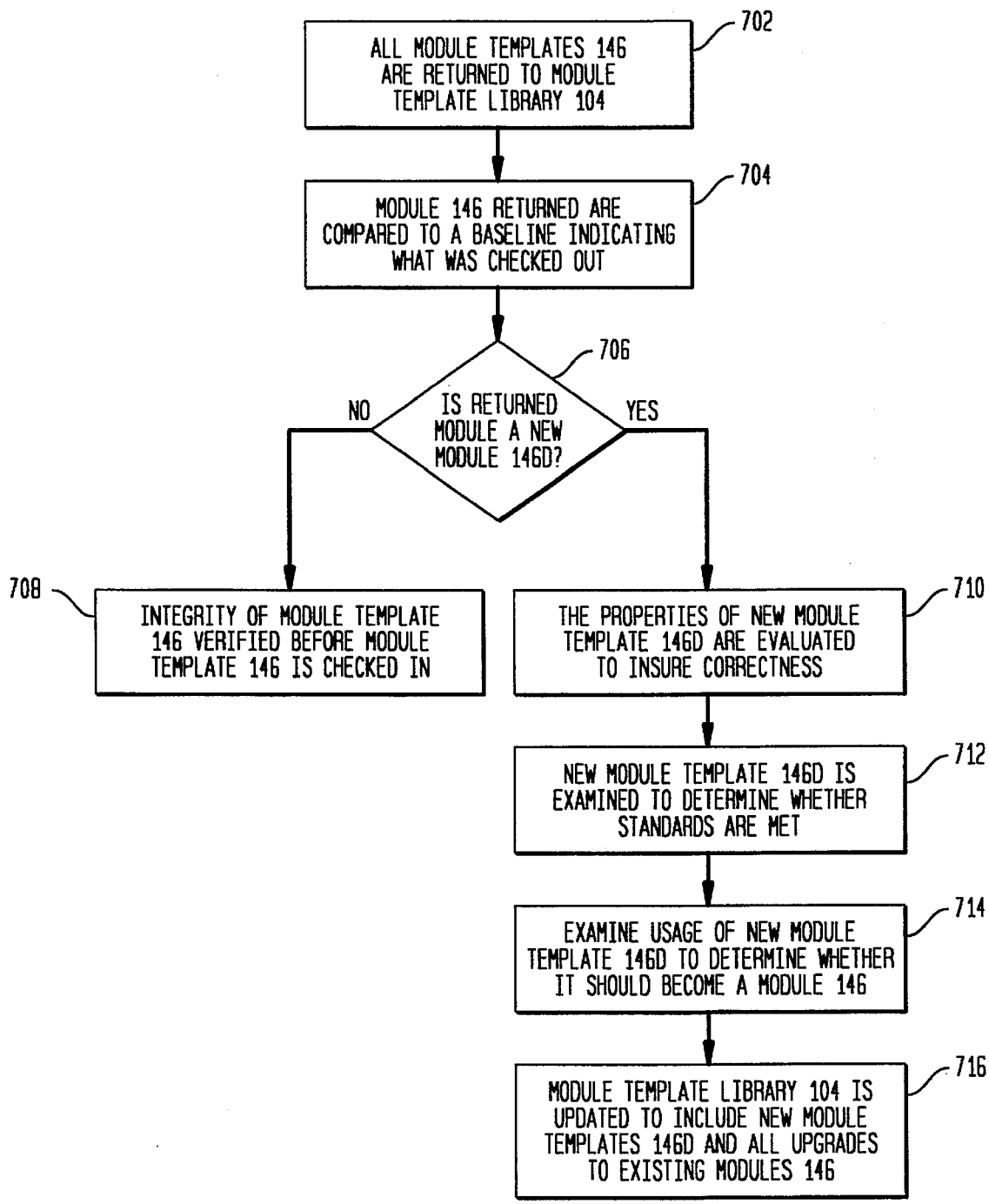

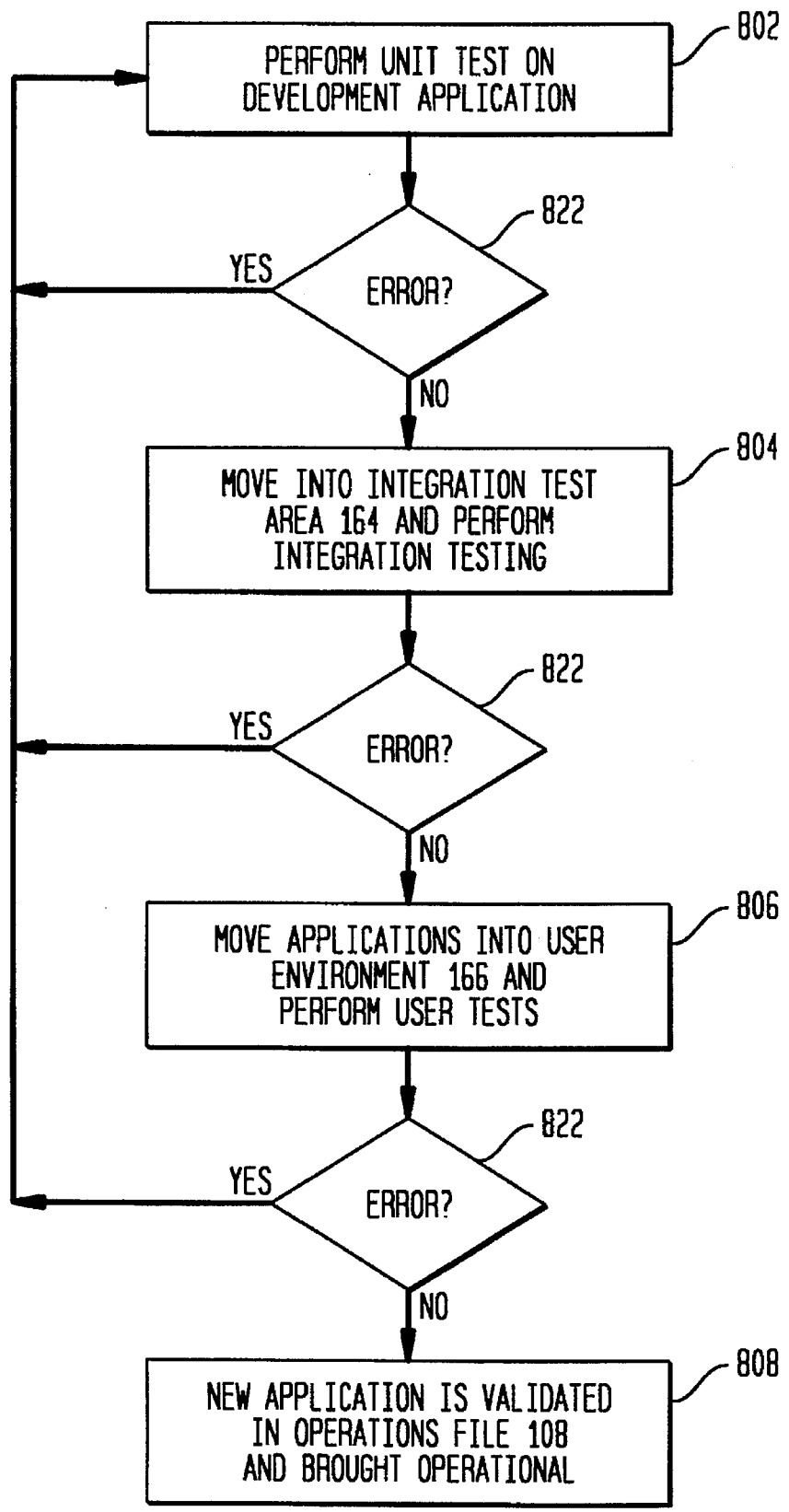

SYSTEM AND METHOD FOR FACILITATING SOFTWARE DEVELOPMENT

This application is a continuation of application Ser. No. 07/986,182, filed Dec. 7, 1992, now abaondoned.

BACKGROUND OF THE INVENTION

1. Field of the Invention

The present invention relates to software development and more particularly, to a system and method for facilitating the distributed development of robust software products that are uniform and consistent and conform to all applicable standards.

2. Related Art

Over recent years, a dramatic increase in processor power, with reduced size, cost, and power consumption, has lead system designers to turn to software solutions more frequently. Software solutions offer numerous advantages over hardware solutions. Software solutions, for example, are more easily adapted to changing requirements, easily duplicated and modified for additional applications, and easily upgraded.

Developers, however, face numerous problems when implementing a solution using software. Most solutions must be provided in a short cycle time, but turn-around times for implementing a software solution are often longer than desired. Conventional systems and methods for developing software do not lend themselves to providing robust software products in a quick turn-around time. Development of an ideal software solution using conventional techniques can be a time consuming process.

In this document the term 'plant' describes an operational environment in which multiple software systems operate. A plant can encompass a number of functions including manufacturing, research, sales, accounting, shipping, and the like. A plant can be a single facility, or can be multiple facilities in one or more locations around the world.

The ideal software solution meets a minimum of five design criteria. First, the ideal software solution comprises highly maintainable code that conforms to industry and shop standards. Industry standards are intended to standardize software solutions throughout the industry. Shop standards further define software characteristics within a particular plant or environment. These standards, when followed, provide a guaranteed minimum level of quality and uniformity within that plant.

Second, the ideal software solution is uniform throughout a plant. Software that is uniform and consistent for all applications can be maintained by a small group of core individuals (versus several small groups, one for each type or variety of code).

Third, the ideal solution provides the users with a "look and feel" with which they are accustomed. For example, if a user hits a "PF" key in a CICS environment, or receives a particular error message, the result or meaning should be consistent from system to system. In other words, a user should be able to log onto a workstation anywhere within a plant and be confronted with a standard user interface that is familiar. The functions keys should perform standard functions and the menu screens should contain common characteristics.

Fourth, the ideal software solution is robust software that performs all required functions effectively and efficiently. No steps are wasted and no additional (unnecessary) steps are included. All functions are performed to specification.

Fifth, the ideal solution is one that is developed, integrated, tested, and brought operational in a short turn-around time.

In a large plant having numerous software driven systems and subsystems implemented in all facets of operations such as manufacturing, development, accounting, sales, and the like, these ideal characteristics become even more critical. If a plant worker is rotated from one process to another, the user interface with which that worker deals should look and feel the same to him or her as did the previous interface. This results in higher productivity, better morale and fewer mistakes.

Additionally, the multiple software solutions within a plant should be maintainable by a small group of core individuals. When multiple teams are required to maintain multiple non-uniform software systems, costs multiply.

Software developed using conventional methods and systems often does not meet all of these requirements. If a quick turn-around time is required, conventional techniques often require additional software developers. If these additional developers are not familiar with applicable shop and industry standards, or if they are not familiar with the look and feel of existing systems, they must be trained. Such training, however, results in additional time and expense.

With conventional techniques, if the software is to conform to these standards, have certain look and feel characteristics, or be uniform for the purpose of maintainability, the onus is on the developer to provide these characteristics. If the developer is unfamiliar with the characteristics of other software systems in that plant, or is unfamiliar with the particular shop and industry standards, time and expense must be devoted to training the developer. Even when properly trained, there will be divergence from the uniformity desired.

What is needed is a system and method for providing software products in a quick turn-around time that conform to shop and industry standards, are uniform, have common look and feel characteristics, are robust, and are highly maintainable.

SUMMARY OF THE INVENTION

The present invention provides a system and method for automated distributed development of software. Highly maintainable, robust software products that conform to applicable shop and industry standards can be developed in a short turn-around time. The system comprises a design template library which stores detailed design specifications, and a module template library which stores pre-prepared, pre-verified software module templates to be used in software applications. Both libraries are interfaced with a software development workstation at which the new software code is developed.

A design template, stored in the design template library, contains the detailed design specifications. The design template library provides the design template to the software development workstation upon request. The design template includes detailed design specifications, detailed process specifications, detailed data specifications, and linkages of the data to the process for the desired application program. The design template sets forth exactly what the application program must do.

The detailed design specifications contained in the design template are derived from the application requirements that were developed in an analysis phase of development. Included in the design template is information pertaining to what screens should look like, what screen appears when a particular key is hit, what key will exit the application, and the like.

The module templates, stored in and provided by the module template library, perform specified functions and are designed to exacting specifications. They meet all applicable shop and industry standards, they all have the same look and feel characteristics, they meet robustness requirements and are uniform and consistent with one another. The module templates are pre-prepared, pre-verified software modules that are "called" by software applications.

In this patent document, the term "develop" and its derivatives, when used in conjunction with an application program, can mean either development of a new application from scratch or modification of an existing application.

In response to a command from a programmer, the software development workstation retrieves a design template from the design template library.

Information set forth in the design template is provided to the programmer. Using this information, the programmer can determine whether an existing application program needs to be modified, or a new application program needs to be developed from scratch. If an existing application program needs to be modified, a copy of that program, or portions thereof, is retrieved from an operations library by the software development workstation. The software development workstation stores the copy in a development library.

Further information available in the design template enables the software programmer to determine which of the pre-prepared module templates stored in the module template library perform the processes required by the application program under development.

Because the module templates are pre-prepared and pre-verified, all the application program has to do is invoke a module template at the correct time to perform its function. The functionality for the application programs exists in the module template library and only has to be called by an application program when needed. Thus, in most instances, all a programmer has to do is write code to invoke the module at the correct time. This code is called "mainline" code.

In response to commands from the programmer, the software development workstation retrieves the necessary module templates from the module template library. The software development workstation provides a platform whereby the programmer can write the mainline code that evaluates conditions and calls, or invokes, a specified module template when that module's function is to be performed.

When a module is called by the mainline code (in an application program), it performs its function identically, regardless of which application invoked it. As a result, the programmer only has to develop mainline code to invoke the appropriate module at the proper time. Thus, time is not spent redesigning existing software modules. The programmers concentrate only on the task of properly invoking the modules. Because a specific function is always performed by the same module template regardless of the application, the operational release is uniform and consistent, and has the same look and feel characteristics.

A unit test area is provided to run unit tests which verify operation of the application according to specification. When it is time to run unit tests on an application under development, the software development workstation retrieves that application from the development library and stores it in the unit test area. This is done in response to a command from the programmer. Because, in most cases, the new code comprises primarily pre-defined software modules from the module template library, unit testing is straightforward.

After unit testing is completed, the application under development is moved from the unit test area to an integration test area where integration tests are performed. In integration testing, the application program is run in conjunction with associated application programs. Integration testing validates the interrelationship between the new application program and other applications. Because the new application program's functionality relies primarily on module templates, integration with other applications (also relying primarily on module templates) is easier. All module templates are pre-tested and verified.

Once the new program has been fully tested, it is checked back into the operations library. Before it is brought on-line as an operational program, it is run through a series of operations and user tests. These tests may be run before the unmodified version is taken off-line. This provides a failover in the event the new program does not perform as required.

A benefit of the present invention is that maintenance of the application program is easier because the application consists primarily of mainline code. Because there is only one instance of each module template in the module template library, maintenance is easier. If a change or update to a module template is required (e.g., an interface requirement is changing), that change only has to be made one time in the module template library. Each application calling that module template will be calling an updated module template.

Another benefit of the invention is that it allows programmers in geographically distant locations to perform software development. Programmers can develop application programs without being in the same physical location as other programmers developing similar application programs.

Another advantage is that software developed according to the present invention is "self-documenting." Because the same module is used in multiple applications, its performance and functionality are known each time it is used. Existing documentation for a given module is applicable to every application that calls that module.

A further benefit of the invention is that strong configuration control is maintained. Because the invention provides strict check-in and check-out procedures for module templates and new application programs, strict control over version updates and module changes can be maintained.

A further benefit is quick turn-around time. Each module template is developed one time. Software code to perform the same function does not have to be re-developed each time an application program is written. Thus, applications are written more quickly and, because module templates are used in multiple applications and are already tested, integration is easier.

Still a further benefit is provided by the design templates stored in the design template library. Because many of the specifications are the same for all applications, these specifications are only stored as one instance in the design template library. These specifications are used over and over again by numerous application development tasks. Because the same specifications are used for multiple applications, uniformity and consistency is assured and development time is shortened.

Further features and advantages of the present invention, as well as the structure and operation of various embodiments of the present invention, are described in detail below with reference to the accompanying drawings.

BRIEF DESCRIPTION OF THE DRAWINGS

The present invention will be described with reference to the accompanying drawings. In the drawings, like reference numbers indicate identical or functionally similar elements. Additionally, the left-most digit of a reference number identifies the drawing in which the reference number first appears.

FIG. 7 is a flow chart illustrating a process for checking module templates into the module template library.

FIG. 8 is a flow chart illustrating a process for conducting testing of development applications.

DETAILED DESCRIPTION OF THE INVENTION

1. Introduction to the Invention

The present invention is directed to a system and method for producing software products that are highly maintainable, conform to applicable shop and industry standards, and are provided in a short turn-around time. Development time is compressed and production is maximized while insuring robustness, uniformity, conformance to standards, and maintainability. Relatively inexperienced software developers can quickly produce software solutions having ideal characteristics.

Figure 1:
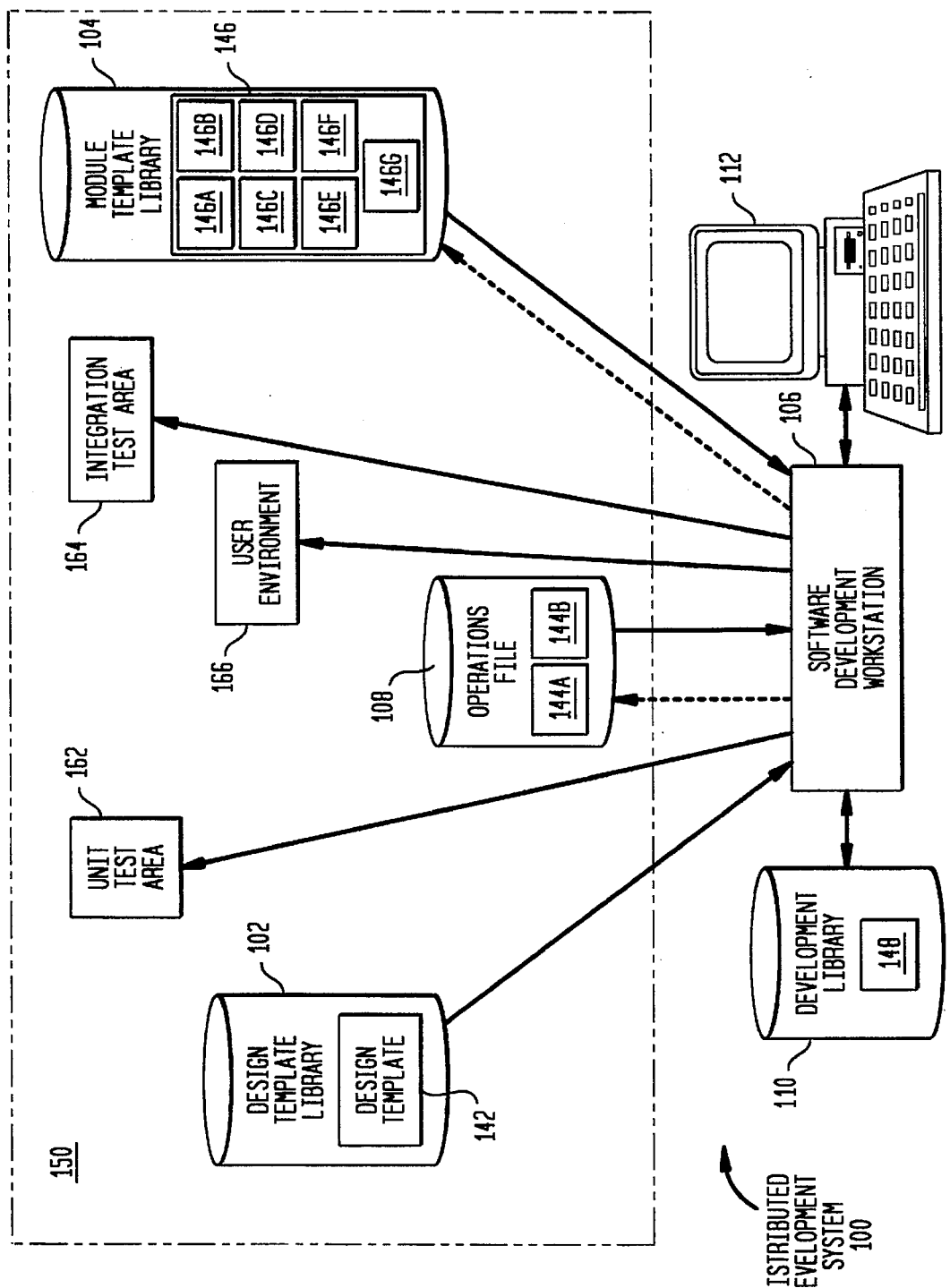
FIG. 1 is a block diagram illustrating a distributed development system according to the present invention.

According to the present invention, application programs that conform to all applicable shop and industry standards, and that are uniform and consistent with other programs running in the plant environment can be developed quickly. FIG. 1 is a block diagram illustrating a distributed development system according to the present invention.

Referring to FIG. 1, the invention will now be generally described. A distributed development system 100 comprises two special-purpose libraries. A design template library 102 stores detailed project requirements and specifications (referred to as "design template 142"). A module template library 104 contains configuration-controlled, pre-prepared software module templates 146 to perform specified tasks. The types of module template 146 stored in module template library 104 are discussed below. Also discussed below are procedures for development, use and control of module templates 146.

In a preferred embodiment, libraries 102, 104 exist in a mainframe environment 150, for example, in a CICS environment. Alternatively, environment 150 may be a workstation or a personal computer such as a DOS 486 machine.

Both libraries 102, 104 are interfaced to a software development workstation 106, where the software programmer develops required application programs. Application programs 144A for operation (i.e. operational releases) are stored in an operations file 108. Programs 144A in operations file 108 can also run in the chosen environment 150. Application programs 144A, 144B comprise existing application programs 144A and newly developed application programs 144B.

A development library 110 provides a workspace for software development and provides a location in which to download an existing application program 144A for modification. Development library 110 can be a disk drive dedicated to workstation 106, shared storage external to environment 150, or shared storage resident within environment 150.

Also included with software development workstation 106 is a user terminal 112. If software development workstation 106 is a personal computer, terminal 112 comprises simply a monitor and a keyboard.

Figure 6:
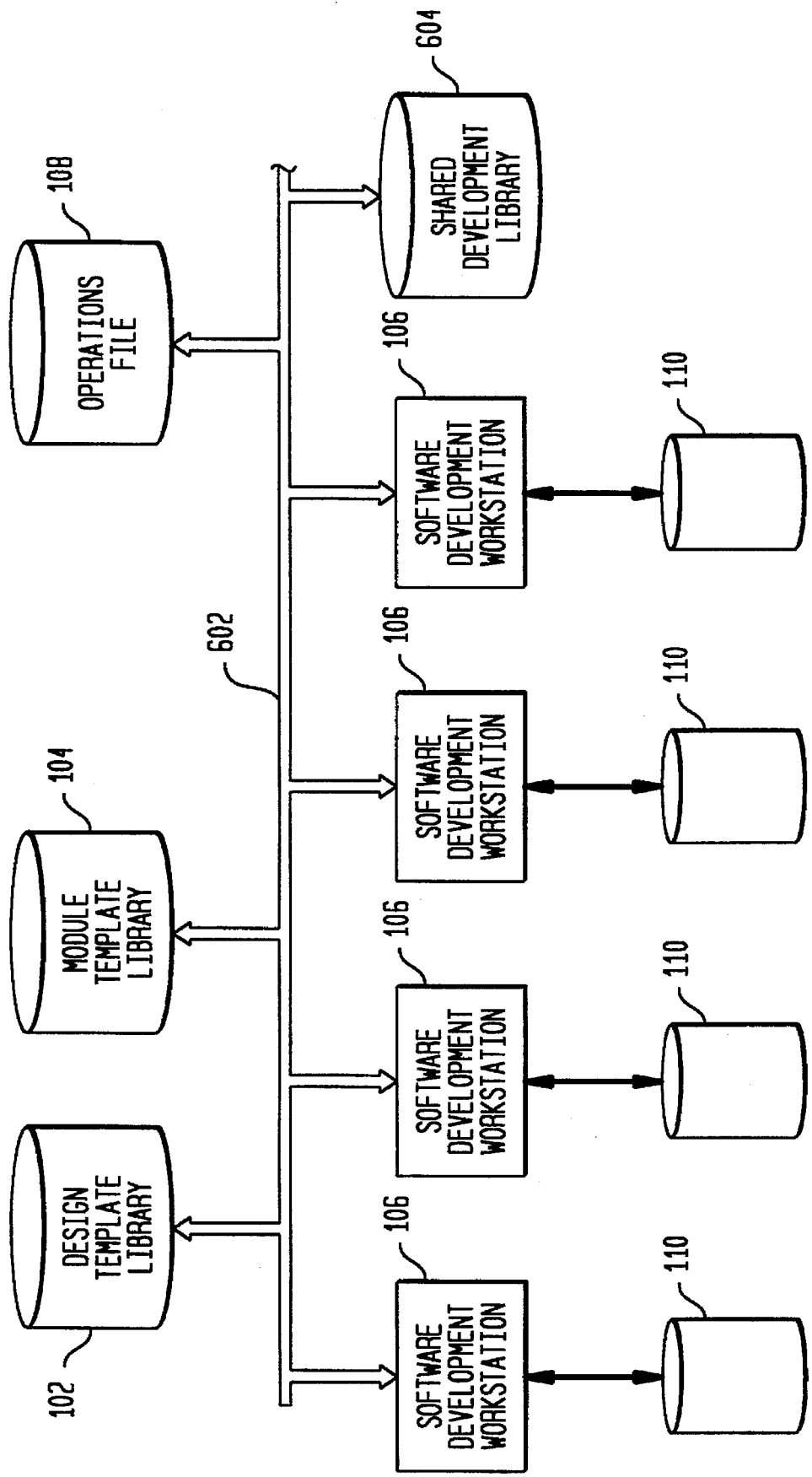
FIG 6 is a block diagram illustrating an automated distributed development system implemented using a local area network.

Note that multiple workstations can be interfaced together and to the libraries 102, 104, 108, 110 via a local area network (LAN). This configuration is illustrated in FIG. 6. Referring to FIG. 6, a LAN 602 is provided to connect multiple software development workstations 106 to design template library 102, module template library 104, and operations file 108. Each software development workstation 106 can have its own development library 110, and/or a shared development library 604 can be provided to support development activities.

According to the invention, when a programmer is assigned a development task, the programmer logs onto software development workstation 106. In response to a command entered by the programmer, software development workstation 106 retrieves design template 142 from design template library 102. The retrieved design template 142 is provided to the programmer for review on terminal 112 or via hardcopy.

Software development workstation 106 then retrieves an existing application program 144A from operations file 108 if that application program 144A is to be modified.

The programmer determines what module templates 146 are needed to perform the functions specified by design template 142. Software development workstation "checks-out," or retrieves, the module template(s) 146 needed to perform the functions as specified in design template 142.

Software development workstation 106 stores application program 144A and module template(s) 146 in development library 110. Software development workstation 106 serves as a platform on which the programmer writes "mainline" code to evaluate conditions, to perform simple operations, and to "call" a module template 146 when necessary.

Module templates 146 are treated as off-the-shelf software components that have been developed to strict requirements. A key to the invention is that module templates 146 conform to all applicable shop and industry standards, have the same look and feel as all other modules within the operating environment, and have robust operating features. Stringent design guidelines are followed in developing module templates 146. No piece of software can become a module template 146 unless it meets all of these characteristics. Strict development practices and check-in procedures are followed before a software module can become a module template 146. These are discussed in detail below with respect to FIG. 7.

Once a module template 146 exists, it cannot be modified without reviews to ensure compliance with the desired characteristics. Thus, an existing module template 146 can be called and used in numerous applications. Because a called module template 146 meets all design criteria (as discussed above), each application program 144 calling module template 146 is assured a high level of robustness, uniformity, maintainability, et cetera, in performing that functionality.

Module templates 146 are treated as system building blocks that can be selected and called to form a completely functional application program 144. Most module templates 146 are called as is with no modifications to the syntax. Other module templates 146 require the mainline code to provide values for variables. If a module template 146 requires variables, these are sent to module template 146 when it is called. In both cases, since the module templates 146 are integrated as is, the functionality provided to application program 144 meets all five of the above-mentioned design criteria.

After the application program is developed, including calls to all necessary module templates, it is transferred into a unit test area 162 by software development workstation 106. At this point, software development workstation 106 allows the programmer to run unit tests to verify performance according to design template 142. When the programmer is satisfied with the developed application program at the unit level, software development workstation 106 transfers the application program to integration test area 164. At this point, integration tests are run to validate the newly developed application program in conjunction with other application programs.

After integration testing, the application program is uploaded to operations file 108 as a new application program 144B. New application program 144B is put through operations testing. In this test phase, performance of new application 144B is verified by users. This can be done in a user environment 166.

During all test phases, the software is checked for robustness, look and feel, conformity and uniformity, and performance per requirements and specifications.

Unit test area 162, integration test area 164 and user environment 166 are separate, dedicated CICS regions within CICS environment 150. Each has its own memory, disk storage and database. Each also has associated programs to perform the required testing functions. Unit test area 162, integration test area 164 and user environment 166 each have access to module templates 146 stored in module template library 104. This access allows the application program under tests to call a required module 146 from module template 104.

After testing is complete, the application is officially checked-in to operations file 108. If new application program 144B is a result of upgrades to an existing application program 144A, part of the check-in procedure validates that 'untouchable' areas of application program 144A have not been modified. This is done using file comparison techniques and code walk-throughs.

The review and check-in process is discussed in more detail below with respect to FIG. 8.

According to the present invention, a plurality of software designers can each be tasked with developing application programs 144 for a given plant environment. Because each programmer integrates module templates 146 from module template library 104, the code they develop conforms to standards, is uniform and consistent, has built-in robustness, and is rapidly produced. Since all developed code is uniform and consistent, and all application programs 144 use the same module template 146 to perform a given function, integration into an overall system is easier as well.

Software built by calling standard library components such as module templates 146 is quicker and easier to build. The unmodified module templates 146 are uniform and consistent, conform to standards, and have a built-in level of robustness. Maintenance is simplified because only one instance of a communications module template 146A, for example, exists. If a modification has to be made to module template 146 (146A for example), that modification only has to be made and tested once.

Operations performed by software development workstation 106, such as transferring, retrieving, and the like, are performed in response to commands entered by the programmer. The commands may be selections from menu screens or entry of commands using a command language.

2. Process of the Invention

Figure 2:
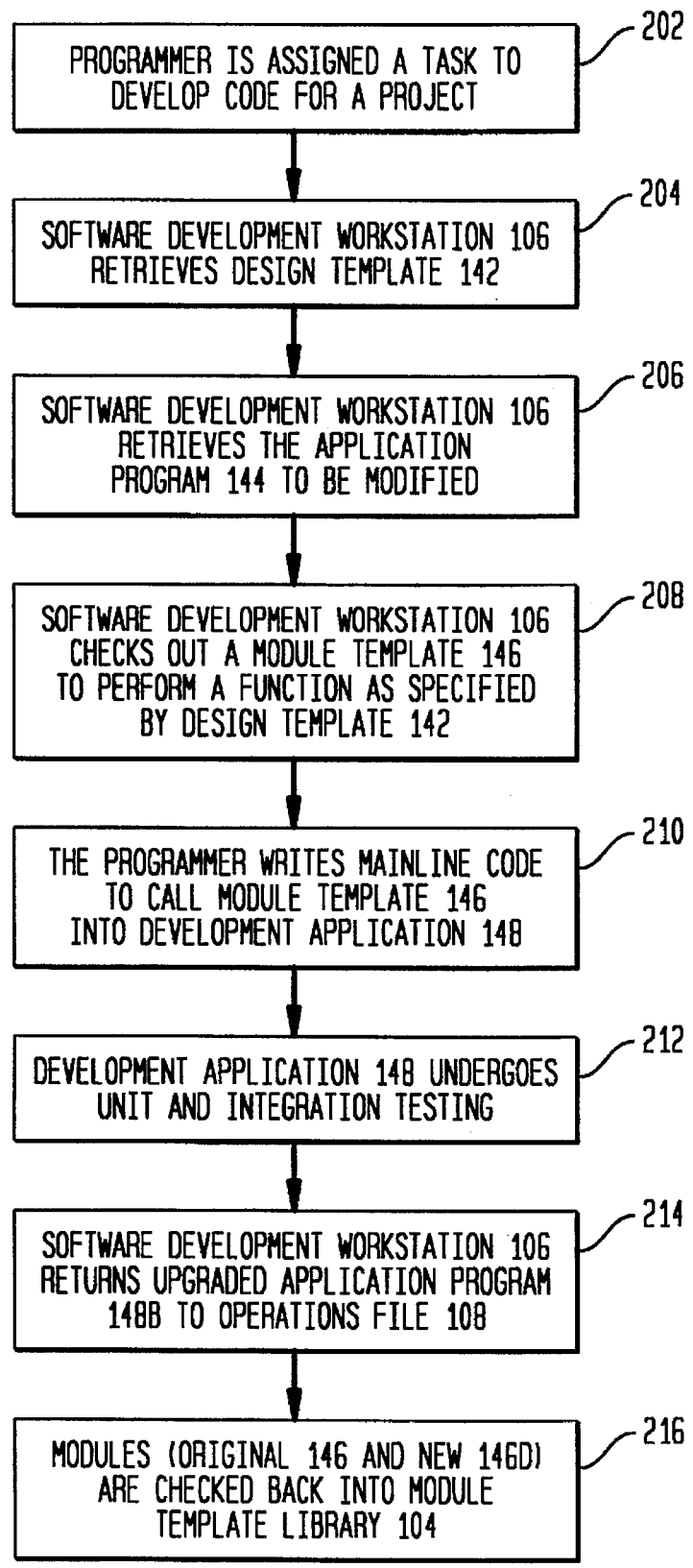
FIG. 2 is a flow chart generally illustrating a distributed development process according to the present invention.

The above introduction provides a high-level overview of the system and method of distributed development. The invention will now be described in greater detail. FIG. 2 is a flow diagram illustrating a general process of the invention. Referring now to FIGS. 1 and 2, in a step 202, a programmer is assigned a task to develop code for a project. The development task may be to generate a totally new application program 144 or to modify an existing application 144A.

The programmer logs onto workstation 106 and accesses design template library 102. As noted above, detailed design specifications (design template 142) are stored in design template library 102. In a step 204, software development workstation 106 retrieves a design template 142 and provides it to the programmer on terminal 112 or via hardcopy. Design template 142 provides sufficient detail to enable the programmer to develop the required software. Included in design template 142 are design specifications, flow diagrams, detailed process specifications, detailed data specifications, and a linkage of data to the process. In effect, design template 142 is a blueprint of how to build the desired system.

Specifications in design template 142 include screen appearance standards, button functionality standards (e.g., "PF*" key functions), and the like. These specifications can be generic specifications applicable to all applications, or can be application specific. A "CLEAR" key exits CICS, a "PF1" key accessed a help function, and so on, are examples of generic specifications.

Design template library 102 provides a means for standards enforcement. Library 102 sets out the basic elements required of all applications as a minimum. Additional elements required for a specific application are described here as well.

Design template library 102 provides a single storage location for all generic specifications. Because generic specifications are not duplicated for multiple applications, updates to a generic specification are made only once.

As a simple example, consider a design template 142 for a materials order process. Design template 142 defines the process as: (1) accept the order, (2) deliver order requirements to warehouse, (3) bill the customer upon shipment, and (4) update account information when paid. The data definition of design template 142 includes a definition of what data is needed for the process such as the data types that have to be sent to the warehouse to place the order (e.g., material, batch number, color). Design template 142 also contains design specification information such as the appearance of all screens, the functionality of all function keys, et cetera.

The programmer reviews design template 142 to determine the scope, nature, requirements, and design specifications for the task. From design template 142, the programmer learns the detailed process that must occur and the data specifications and linkages for that process.

In a step 206, if the project requires modification to an existing application program 144A, software development workstation 106 retrieves the existing application program 144A to be modified. If only portions of existing code are to be modified, only those portions are retrieved. The code to be modified is stored as a development application program 148 in development library 110.

If new code is to be developed independently of existing applications programs 144A, step 206 is omitted.

Note that in step 206 only the portions of existing application program 144A that are to be modified are retrieved. To maintain proper configuration control, checkout procedures are followed when retrieving application program 144A (or portions thereof) from operations file 108.

In a step 208, software development workstation 106 accesses module template library 104, and "checks out" (retrieves) a module template 146 needed to perform a function as specified by design template 142. Some module templates 146 are fixed syntax modules that are used "as-is" by the application program. Other module templates 146 require the specification of certain key parameters or variables depending on the application. In both instances, interface (mainline) code is written in a step 210 to interface the selected module template 146 in a development application program 148.

In step 210, the programmer writes the mainline code necessary to evaluate conditions and call module template 146 when the proper conditions exist. If necessary, the programmer provides variables to be supplied to module template 146. For example, if a module template 146F to send a screen to a terminal is called, the mainline code must supply a variable indicating which screen to send. If module template 146 performs a calculation, the mainline code must supply the data to be calculated or tell module template 146 where to get the data. Software development workstation 106 provides a platform on which mainline code can be written.

In a step 212 development application 148 is transferred to unit test area 162 and then integration test area 164 where unit and integration testing (respectively) are performed to determine whether development application program 148 meets design template 142 specifications and functional requirements. Unit and integration testing are described in greater detail below with respect to FIG. 8.

In a step 214, development application program 148 is returned to operations file 108 as a newly upgraded application program 144B. Check-in procedures are followed in this step to ensure compliance with requirements and specifications. No software can be checked into operations file 108 without following check-in procedures (discussed below). Modifications are checked against design criteria (e.g., shop and industry standards, look and feel, robustness, etc.) to ensure conformance. These procedures are discussed in greater detail with reference to FIG. 8.

In a step 216, module templates 146, checked out of module template library in step 208, is checked back into module template library. Check in procedures for module template 146 are discussed below with reference to FIG. 7.

3. Example Implementation of the Invention

Figure 3:
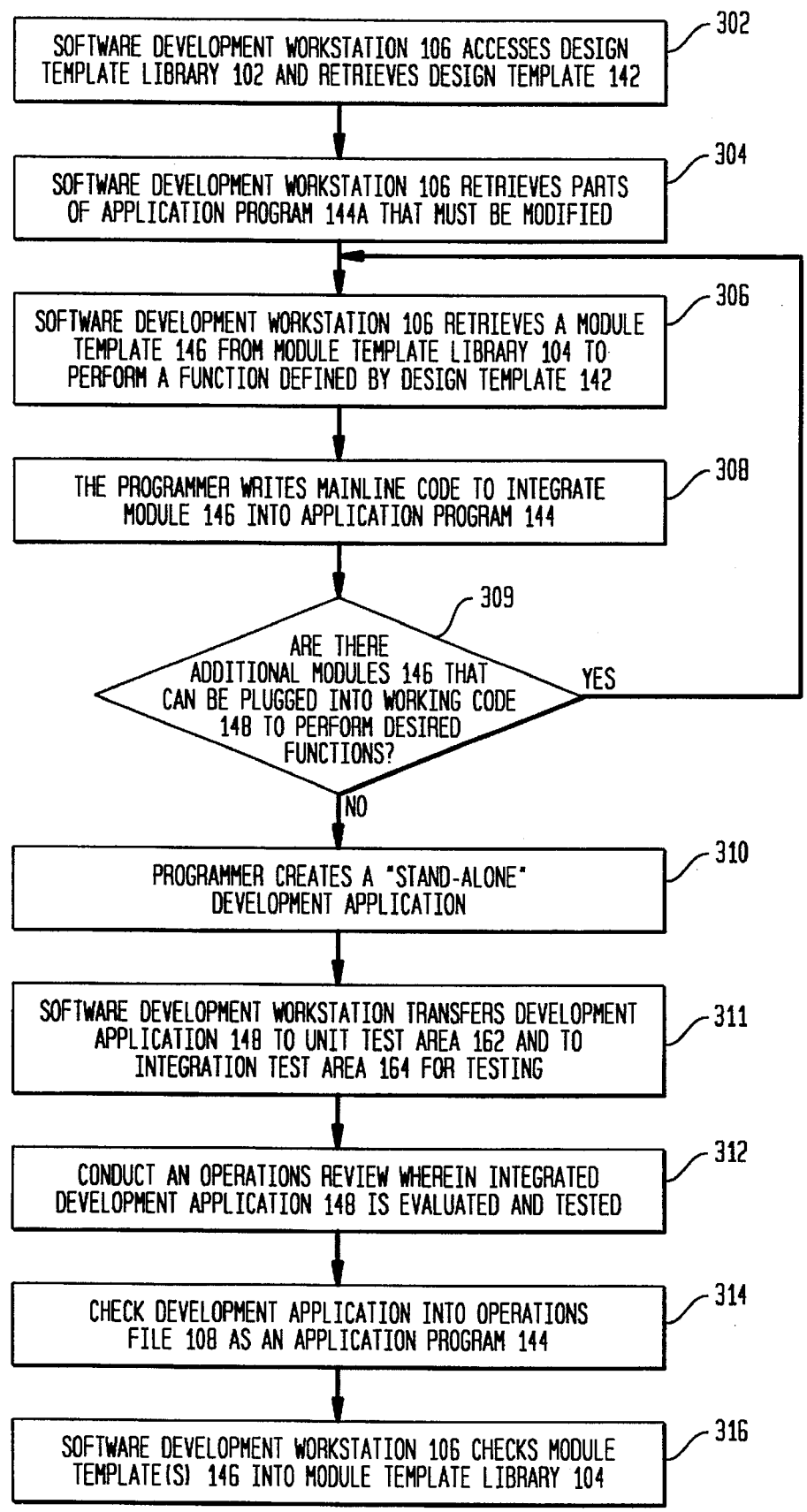
FIG. 3 is a flow chart illustrating by way of example the distributed development process according to the present invention.

To further illustrate the above description, consider the following example. In this example, the task is to upgrade a warehouse inventory system to include inventory information regarding future availability of widgets based on pending orders and manufacturing schedules, and to make this information available to regional sales offices. FIG. 3 is a flow diagram illustrating the method of the present invention according to this example.

Referring to FIG. 3, in a step 302, software development workstation 106 accesses design template library 102 and retrieves design template 142. Design template 142 includes information pertaining to the process to be followed, a definition of the data needed for the process, and a linkage of the data to the process.

Figure 4:
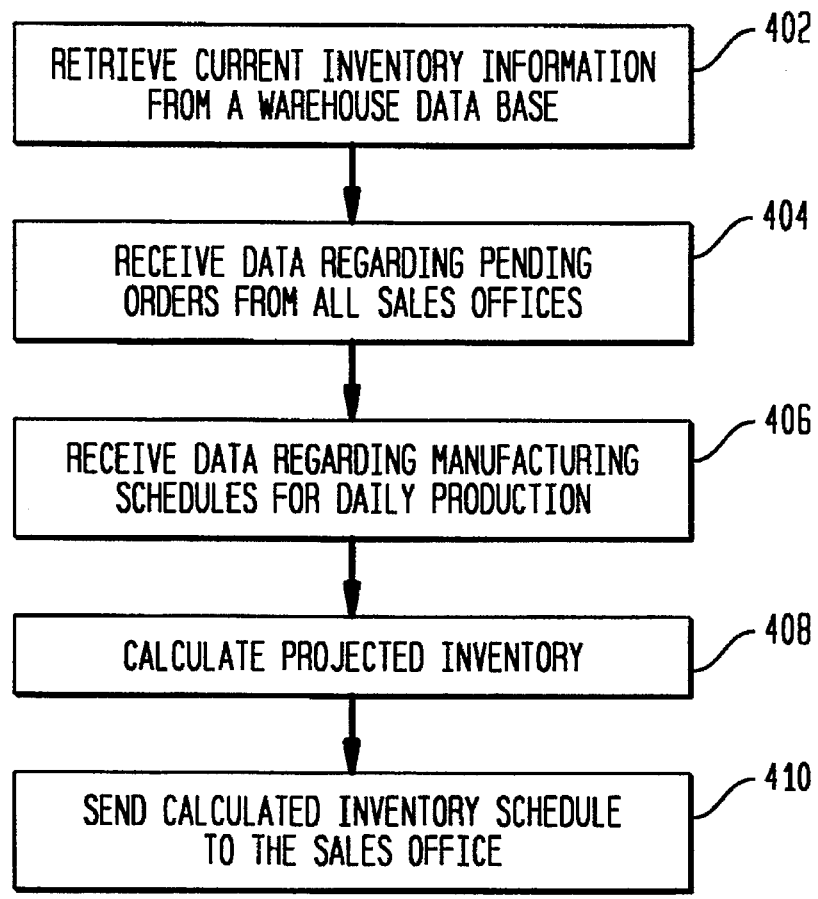
FIG. 4 is a diagram illustrating by way of example process steps included in a design template.

Specifically, design template 142 specifies a series of process steps and data requirements for each process step. These process steps are illustrated in FIG. 4. Design template 142 also specifies the appearance of the screens used to display the inventory information and the functions of function keys.

The first process step is to retrieve current inventory information from a warehouse data base. This information includes the number of currently available widgets. This is illustrated by block 402.

Next, data regarding pending orders must be received from all sales offices. This information includes the number of widgets committed to delivery to customers on each day. This is illustrated by block 404.

Additionally, data regarding manufacturing schedules for the daily production of widgets must be received. This information includes the number of additional widgets to be provided to the warehouse each day. This is illustrated by block 406.

Once all of the above information is obtained, a projected inventory is calculated. This is calculated by taking the current inventory information for day 1, subtracting the number of widgets to be shipped that day and adding the number of widgets to be provided by manufacturing that day. For the second day, the calculation from day one is used as the current inventory, pending orders scheduled for day two are subtracted and the number of widgets projected to be supplied by manufacturing are added. This calculation is illustrated by block 408.

The calculated inventory schedule is sent to the sales offices (block 410) for their viewing in response to a menu screen selection. The schedule is similarly available to the warehouse and to manufacturing.

In a step 304, software development workstation 106 retrieves parts of application program 144A that must be modified to complete the task. These parts are stored as developmental application program 148 in development library 110. In this example, the pieces to be modified include pans of the sales software system, manufacturing software system and the inventory software system.

The programmer determines which module template 146 performs a function defined by design template 142. For example, the programmer determines that a communications transmit module template 146C that allows one system to send data to another will send inventory data to a sales office as specified in block 410.

In a step 306, software development workstation retrieves a needed module template 146 is determined by the programmer.

Figure 5:
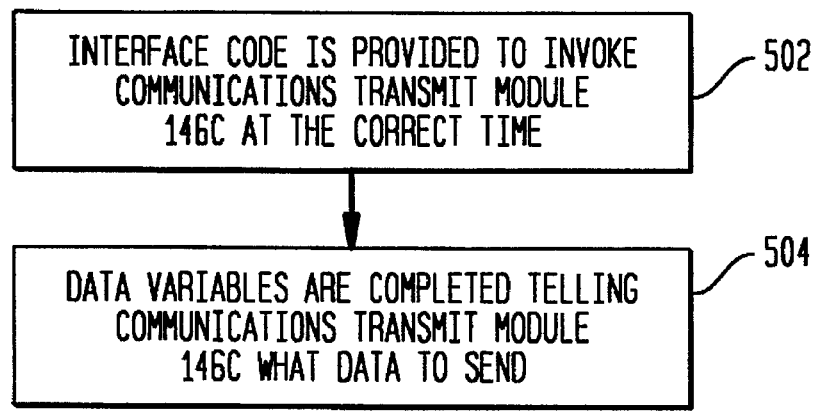
FIG. 5 is a diagram illustrating a method of integrating a module template into an application program.

In a step 308, the programmer develops mainline code to evaluate conditions and call the appropriate module template 146 at the correct time. According to the present example, the programmer writes code that invokes communications transmit module template 146C when inventory data is calculated and ready to be transmitted. The process of step 308 is discussed in greater detail with reference to FIG. 5. In a step 502, mainline code is provided to invoke the communications transmit module template 146C at the correct time (when the proper conditions have occurred). For example, the module template 146C may be invoked to send inventory information to the sales office upon completion of the inventory calculation, or may be invoked at a predetermined time as specified by design template 142.

In a step 504, data variables are completed, telling communications transmit module template 146C what data to send to the sales office (i.e. a destination variable is provided). If the data is to fill a standard screen, the programmer tells the module (by use of a screen variable) what screen to fill with the data, and how to fill the screen. The module then creates the screen and sends it. For example, the programmer would complete the data variable to send data set 'X' with screen 1. The location of data within dataset 'X' determines where on the screen that data is written.

Since all systems in the plant are designed according to the present invention, the programmer does not have to worry about the proper communications protocols. The transmit module template 146C provides the protocols necessary to communicate with a receive module template 146 in the library 104.

Software development workstation 106 provides a platform on which this mainline code can be developed. Development library 110 provides a work area to store development application 148 and retrieved module template 146.

In a step 309, steps 306 and 308 are repeated for each available module template 146 to be called by the application program 144. For each function called out in design template 142, the programmer writes mainline code to call a module template 146 from module template library 104. This is illustrated by the loop created by decision block 322.

In a step 310, the programmer uses the mainline code and checked out module(s) to form a "stand-alone" development application that can be verified by itself. This allows the programmer to determine whether he or she has everything needed for the unit testing phase.

In a step 311, software development workstation transfers development application 148 to a unit test area 162 for unit testing and to integration test area 164 for integration testing. This testing is performed to the extent possible given the emulation/simulation facilities available. In some environments a full-blown simulation system may be provided where software modifications can be tested in a simulated operational environment. Unit and integration testing are further described below.

In a step 312, an operations review is conducted wherein the integrated development application 148 (including the integrated module(s) 146) is evaluated and tested. The evaluation is performed by users and senior-level system designers and analysts to determine that all design criteria have been met. If these criteria are not met, development application 148 cannot be checked in to operations file 108 as an operational application 144A.

In a step 314, once the integrated development application is approved, it is checked in to operations file 108 as a newly upgraded application program 144B. Before switching operations over from applications program 144A to the newly upgraded applications program 144B, user, integration and operational tests are performed. Both applications 144A, 144B may be run in parallel for a period of time to allow evaluation of newly upgraded applications program 144B.

In a step 316, all module templates 146 checked out of module template library 306 are checked back in. The check-in process is described in detail below with reference to FIG. 7.

If a module template 146 does not exist to perform a desired function, a new module template 146D is created. New module template 146D is designed according to all of the above-described design criteria. Before new module template 146D can be checked into module template library 104, new module template 146D must undergo extensive reviews and testing to ensure compliance with shop and industry standards, to verify robustness and performance, to ensure that all functional requirements are met, and to verify that new module template 146D provides users with familiar look and feel characteristics. The check-in procedure for new module template 146D is described below with reference to FIG. 7.

Once a new module template 146D is checked into module template library 104, it is available as a standard building block to all designers. Other programmers can call new module template 146D (now a module template 146), and use it with confidence that all design criteria are met.

4. Description of the Check-in Procedures

The foregoing description describes a process of the invention without describing the details of check-in procedures for applications programs 144 and for module templates 146. This section of the document provides a detailed description of these check-in procedures.

FIG. 7 is a flow chart illustrating the check-in process for a new module template 146 or an enhancement to an existing module template 146. When an application is being developed, module templates 146 are checked out of module template library 104. In a step 702 all module templates 146 are returned to module template library 104.

In a step 704, the module templates 146 returned are compared to a baseline indicating what was checked out. This is a module-to-module comparison. For every module template 146 checked out, the existence of an incoming module is checked. If a module template 146 is being checked in that was not checked out, this is a new module template 146D.

Step 704 is accomplished by first checking for the existence of a module and by then checking the existence of objects within a module. The properties of the objects are checked to determine whether this is a new module template 146D. For example a screen object is checked for data structures, screen layout, and the like. In other words, the properties of the objects are checked.

In a step 706, if module template 146 is an existing module, the check-in process continues at a step 708. If the module is a new module template 146D, or an update to an existing module template 146, the process continues at a step 710.

In step 708, the properties of module template 146 are checked to ensure that they are the same as when module template 146 was checked-out of module template library 104. All properties must be identical to maintain the integrity of module template 146. For example, a "PF1" key function must be the same when module template 146 is checked in as when module template 146 was checked out. This test insures the integrity of module template 146.

To perform the test in step 708, module template 146 in module template library 104 is overlaid onto module template 146 in the application. This can be accomplished by a file comparison technique.

Steps 710 through 716 describe the process for checking in a new module template 146. In step 710, the properties of new module template 146D are evaluated to insure correctness. For example, data structures are verified, screen layouts are checked, function key functionality is checked, et cetera.

In step 712, new module template 146D is examined to determine whether standards are met. There are standards for naming files, for effective dates, audit trails, and the like.

If new module template 146D passes steps 710 and 712, its usage is examined in step 714 to determine whether it should become a module template 146. If new module template 146D is generic such that it can be applied to multiple applications, it is a candidate for addition to module template library 104. If, on the other hand, new module template 146D is application specific, there is no reason to add it to module template library 104 as a module template 146.

In step 716, module template library 104 is updated to include all new modules and all upgrades to existing module templates 146 (also checked in through steps 710 through 716). If new module template 146D (or an updated module) is to be added to module template library 104, it is held and added at the next release. At the next release, when module template library 104 is updated, all module templates 146 are checked back into module template library 104. After module template library 104 is upgraded, programmers can continue development operations. This procedure ensures that all programmers are working with the same version module template 146.

FIG. 8 is a flow chart illustrating the testing and check-in process for a new application program 144. Referring to FIGS. 1 and 8, in a step 802, a unit test is performed. In this test, the application as a stand-alone unit is tested for functionality. In this step the application is first compiled into a unit test area 162, where it can run and be tested by itself. The application is executed and checked against test criteria. For example, the application should allow entry into particular fields, should write to certain data base files, or should call subsystems like distribution.

After functional stability of the unit has been tested in step 802, it is moved into a system integration test area 164 and integration testing is performed. This is illustrated by step 804. In this environment, an application is checked to determine whether it can function with other application programs 144. When the application under test calls other applications, or sends data to other applications, it can be verified that the applications are communicating with each other.

Integration testing verifies "touch points" of an application. A touch point is a part of an application where an application is entered or exited (i.e., where an application "touches" other applications). For example, one touch point may allow entry into an application from a menu and another may allow exit into another application. Integration testing determines whether touch points are stable, that is whether the application "fits" well with the other applications.

Step 804 is repeated for each development application 148.

In a step 806, once operational functionality is demonstrated in the system integration environment, the applications tested are moved into a user environment 146 within operations file 108 and operations testing is performed. In operations testing, functionality of the release is checked against performance requirements. Operations testing includes full-blown user tests and tests in actual operations.

A user terminal (not pictured) is provided. It is from this user terminal that the user performs operations testing. User terminal can be either a stand-alone workstation or a dumb terminal that relies on environment 150.

If errors or problems (decision boxes 822) are discovered in any step, the error is corrected and the process for that application begins again. The application is checked in, it goes through unit testing (step 802), integration testing (step 804), and user testing (step 806). In other words, there are three layers of quality control.

In a step 808, new application program 144B is used for actual operations for a period of time necessary to validate its performance, preferably 4–6 weeks months. After new application program 144B is validated, the old application program is removed and new application program 144B becomes the standard operational application 144A.

5. Detailed Description of the System Libraries

The above description briefly describes the contents of the module template library 104. Referring still to FIG. 1, the following description more specifically describes module template library 104.

Module template library 104 is used to store common software module templates 146 to be used in numerous applications. Module templates 146 are software building blocks that have been designed and built in accordance with all applicable shop and industry standards. Module templates 146 are all uniform, and all provide a user interface, where applicable, with the same look and feel.

Module templates 146 are designed and built using strict standards and their quality and robustness is assured. Module templates 146 are built by designers who are intimately familiar with the applicable standards, and with the look and feel of shop software. Before a new module template 146D is accepted and entered into module template library 104, it is passed through strict design reviews where conformance with standards and look and feel are verified. Equally important are a performance and requirements review to assure robustness and to assure that all required functions are performed.

Several different types of module template 146 can be included in module template library 104. Template data structures module template 146A, define data structures for the plant environment. Template data structure module templates 146A define what pertinent data looks like to a program.

For example, for a customer table module template 146A defines the data structure as follows: customer name 1 (30 characters), customer name 2 (30 characters), address line 1 (30 characters), address line 2 (30 characters), place code (5 characters), customer code (8 characters), and zip code (9 characters).

As another example, the data structure in a material table may be defined as: material code (8 characters), material short name (40 characters), material long name (72 characters), material description (500 characters), unit of record (e.g. pounds, or ca.)(2 characters).

Input/output (I/O) module templates 146B are included. An I/O module template 146B comprises pre-defined syntax for performing a particular read, write, or update operation. For example, if a requirement calls for going to a particular file and reading the contents of that file, every application program 144 with this requirement uses the same I/O module template 146B. This I/O module contains all protocols, data structures, and indexes necessary to interface to that file.

Global programming module templates 146E are also included. A global programming module template 146E is exactly called into an application program 144. No syntax is changed or modified in any way when a global programming module template 146E is copied. For example, a particular handle error condition would be treated exactly the same way regardless of the application program 144 in which it is running. Thus, the handle error condition could be stored as a global programming module template 146E and copied exactly for use.

Program specific module templates 146F, included in module template library 104, are provided to perform a very similar process in each application program 144, but involve some variables that may change depending on the specific application. For example, consider a program specific module template 146F to send a screen to a terminal. The actual screen sent will depend on the application program 144 (or portion thereof calling this module template 146F). Each screen has its own unique map name. For each screen sent, the syntax of program specific module template 146F is the same, but the map name variable is different. Thus, the syntax is common and identical in every application program 144 and only the variables are different.

Process module templates 146G are provided to handle situations where an identical process is to be used but the means for performing that process is different. For example, when an application program 144 updates a data base, a number of log files must also be updated to log pertinent update and housekeeping information. The process for this update is the same for each data base update regardless of the application program 144, but the number of records that must be updated varies. Thus, the process is similar, but the actual code used varies.

6. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer-implemented method for aiding a developer in developing an application program that conforms to plant standards, comprising the steps of:

(a) storing, in a module template library, a plurality of pre-developed software modules that perform a function in conformance with plant standards, wherein each of said pre-developed software modules is a module template, each module template having at least one baseline object having at least one baseline property;

(b) providing project requirements and specifications for the application program specifying one or more functions performed by said module templates to the developer, wherein said project requirements and specifications are stored in a design template;

(c) checking-out from said module template library an instance of said plurality of module templates for use in the application program;

(d) extracting and retaining said baseline object and said baseline property from within said module template instance when checking-out said module template instance from said module template library;

(e) developing mainline code for the application program on a development platform in accordance with said project requirements and specifications provided by said design template, wherein said mainline code evaluates conditions, and calls said module template instance to perform said specified function;

(f) modifying said checked-out module template instance during said step of developing;

(g) checking-in said module template instance into said module template library after the completion of said step of developing;

(h) extracting at least one check-in object and at least one check-in property respective to said baseline object and said baseline property from within said module template instance when checking-in said module template instance into said module template library;

(i) comparing said check-in object and said check-in property against said retained baseline object and said retained baseline property;

(j) defining said module template instance as a new module template instance if said comparing indicates a difference between said check-in object and said check-in property when compared against said retained baseline object and said retained baseline property;

(k) firstly examining said new module template instance to determine if it conforms with said plant standards;

(l) if said new module template instance is determined to be in conformance with said plant standards, secondly examining said new module template instance to determine if it is generic;

(m) if said new module template instance is determined to be generic, holding said new module template instance in a candidate module library update set; and (n) periodically upgrading said module template library to include said candidate module library update set, wherein only one instance of each of said plurality of module templates is maintained and thus all application programs calling a module template perform said specified function in conformance with said plant standards.

2. The computer-implemented method of claim 1, further comprising the step of transferring the application program to a unit test area where the application program is tested for compliance with said requirements and specifications.

3. The computer-implemented method of claim 1, further comprising the step of transferring the application program to an operations file as an operational application program.

4. A computer-based system for aiding a developer in developing an application program that conforms to plant standards, comprising:

first means for storing a plurality of module templates, wherein each said module template is a pre-developed software module that performs a function in conformance with the plant standards, each of said plurality of module templates having at least one baseline having at least one baseline property;

second means for providing a design template to the developer, wherein said design template comprises project requirements and specifications for the application and specifies one or more functions performed by said module templates;

a software development workstation, coupled to said first and second means, for providing a development platform on which the developer develops the application program, wherein the application program includes mainline code that evaluates conditions, and calls said module template to perform said specified function in accordance with said project requirements and specification provided by said design template;

third means for checking-out from said module template library an instance of said plurality of module templates for use in the application program;

fourth means for extracting and retaining said baseline object and said baseline property from within said module template instance when checking-out said module template instance from said module template library;

fifth means for developing mainline code for the application program on a development platform in accordance with said project requirements and specifications provided by said design template, wherein said mainline code evaluates conditions, and calls said module template instance to perform said specified function;

sixth means for modifying said checked-out module template instance during said developing;

seventh means for checking-in said module template instance into said module template library after the completion of said developing;

eighth means for extracting a check-in object and a check-in property respective to said baseline object and baseline property from within said module template instance when checking-in said module template instance into said module template library;

ninth means for comparing said check-in object and said check-in property against said baseline object and said baseline property;

tenth means for defining said module template instance as a new module template instance if said comparing indicates a difference between said check-in object and said check-in property when compared against said baseline object and said baseline property;

eleventh means for firstly examining said new module template instance to determine if it conforms with said plant standards;

twelfth means for, if said new module template instance is determined to be in conformance with said plant standards, secondly examining said new module template instance to determine if it is generic;

thirteenth means for, if said new module template instance is determined to be generic, holding said new module template instance in a candidate module library update set; and fourteenth means for periodically upgrading said module template library to include said candidate module library update set, wherein only one instance of each of said plurality of module templates is maintained and thus all application programs calling one of said plurality of module templates perform said specified function in conformance with plant standards.

5. The computer-based system of claim 4, further comprising means, coupled to said software development workstation, for testing the application program for compliance with said requirements and specifications.

6. The computer-based system of claim 4, further comprising means for transferring the application program from said software development workstation to an operations file as an operational application program.

7. The computer-based system of claim 4, further comprising means for providing an existing application program to said software development workstation, wherein said existing application program is to be modified to develop the application program.

8. The computer-based system of claim 5, wherein said means for testing the application program comprises:

third means for performing a unit test of the application program to evaluate the application program as a stand-alone program;

fourth means, coupled to said third means, for performing an integration test of the application program to evaluate the functionality of the application program with at least one other application program; and fifth means, coupled to said fourth means, for performing a user test on the application program to evaluate the performance of the application program in a user environment.

\* \* \* \* \*

UNITED STATES PATENT AND TRADEMARK OFFICE
CERTIFICATE OF CORRECTION

PATENT NO. : 5,671,415  
DATED : September 23, 1997  
INVENTOR(S) : K. Omar Hossain Page 1 of 1

It is certified that error appears in the above-identified patent and that said Letters Patent is hereby corrected as shown below:

Column 16,
Line 49, after the word "baseline" insert therefore -- object --.

Signed and Sealed this

Twenty-seventh Day of November, 2001

Attest:

*Nicholas P. Godici*

NICHOLAS P. GODICI
*Attesting Officer*    *Acting Director of the United States Patent and Trademark Office*